US010136185B2

(12) United States Patent
Kalampoukas et al.

(10) Patent No.: US 10,136,185 B2
(45) Date of Patent: Nov. 20, 2018

(54) SYSTEM AND METHOD FOR DETECTING UNKNOWN TV COMMERCIALS FROM A LIVE TV STREAM

(71) Applicant: Alphonso Inc., San Carlos, CA (US)

(72) Inventors: Lampros Kalampoukas, Brick, NJ (US); Manish Gupta, Bangalore (IN)

(73) Assignee: Alphonso Inc., Mountain View, CA (US)

( * ) Notice: Subject to any disclaimer, the term of this patent is extended or adjusted under 35 U.S.C. 154(b) by 0 days.

(21) Appl. No.: 15/333,954

(22) Filed: Oct. 25, 2016

(65) Prior Publication Data

US 2018/0115803 A1 Apr. 26, 2018

(51) Int. Cl.

*H04N 21/4545* (2011.01)
*H04N 21/234* (2011.01)
*H04N 21/235* (2011.01)
*H04N 21/81* (2011.01)
*H04N 21/845* (2011.01)
(Continued)

(52) U.S. Cl.

CPC ..... *H04N 21/45457* (2013.01); *H04N 21/234* (2013.01); *H04N 21/235* (2013.01); *H04N 21/44008* (2013.01); *H04N 21/4542* (2013.01); *H04N 21/812* (2013.01); *H04N 21/8456* (2013.01)

(58) Field of Classification Search

CPC .................................................. H04N 21/454
See application file for complete search history.

(56) References Cited

U.S. PATENT DOCUMENTS 9,508,194 B1 * 11/2016 Worley, III ........... G06T 19/006
2003/0101144 A1 5/2003 Moreno
(Continued)

FOREIGN PATENT DOCUMENTS

WO 2009150425 A2 12/2009

OTHER PUBLICATIONS

Brandon Satterwhite and Oge Marques, "Automatic Detection of TV Commercials." (Satterwhite, B.; Marques, O.; Potentials, IEEE, vol. 23, Issue 2, Apr.-May 2004, pp. 9-12 (4 pages).
(Continued)

*Primary Examiner* — Joshua D Taylor
(74) *Attorney, Agent, or Firm* — Panitch Schwarze Belisario & Nadel LLP

(57) ABSTRACT

Unknown potential commercials are detected in a video data stream that contains segments of program type content, and blocks of commercial content. Each block includes a plurality of successive individual commercials. A library of known commercials is maintained in a first database. A video data stream is received in a video processing engine which includes a search engine that is in communication with the first database. The search engine identifies all known commercials in the video data stream and their respective start and end times. The video processing engine identifies all time segments that are sandwiched between the known commercials. The video processing engine filters out as a potential commercial any identified time segments that are significantly longer than the time length of a commercial. The video processing engine designates content of each of the time segments that were not filtered out as being one or more unknown potential commercials.

4 Claims, 6 Drawing Sheets

START
500 Detect Beginning of Commercial Break
502 Evaluate Video Data Stream Against Database of Known Commercials
504 Unknown Video Segment Detected?
N
Y
506 Is unknown video segment sandwiched between known commercials?
Y
508 Clip Content of Video Segment
N
510 Is unknown video segment sandwiched between beginning of commercial break and first known commercial?
Y
512 Clip Content of Video Segment
N
514 Detect End of Commercial Break
516 Is unknown video segment sandwiched between end of commercial break and last known commercial?
Y
518 Clip Content of Video Segment
N
END

(51) Int. Cl.
*H04N 21/44* (2011.01)
*H04N 21/454* (2011.01)

(56) References Cited

U.S. PATENT DOCUMENTS

2003/0121046 A1 6/2003 Roy et al.
2004/0226035 A1* 11/2004 Hauser, Jr. ........... G11B 27/034 725/9
2005/0193016 A1 9/2005 Seet et al.
2006/0029368 A1* 2/2006 Harville ................... H04N 5/76 386/230
2006/0041902 A1 2/2006 Zigmond
2006/0245724 A1 11/2006 Hwang et al.
2008/0267584 A1* 10/2008 Green ...................... H04N 5/76 386/250
2009/0254933 A1 10/2009 Gupta et al.
2010/0153993 A1 6/2010 Konig et al.
2010/0246955 A1* 9/2010 Wright ............... G06K 9/00711 382/173
2010/0306808 A1 12/2010 Neumeier et al.
2011/0145001 A1 6/2011 Kim et al.
2011/0208722 A1 8/2011 Hannuksela
2011/0289114 A1 11/2011 Yu et al.
2012/0114167 A1 5/2012 Tian et al.
2013/0071090 A1 3/2013 Berkowitz et al.
2013/0160038 A1 6/2013 Slaney et al.
2013/0205318 A1 8/2013 Sinha et al.
2014/0013352 A1 1/2014 Shavit et al.
2014/0133695 A1 5/2014 Lienhart et al.
2015/0082349 A1 3/2015 Ishtiaq et al.
2016/0037232 A1* 2/2016 Hu ....................... H04N 21/812 725/34
2016/0150274 A1 5/2016 Bilobrov et al.
2016/0205289 A1* 7/2016 Li ......................... G06T 7/0079 348/700

OTHER PUBLICATIONS

Wikipedia entry for "Automatic Content Recognition." downloaded from web page: https://en.wikipedia.org/w/index.php?title=Automatic_content_recognition&printable=yes, download date: Aug. 11, 2016, 4 pages.
Audible Magic® product brochures: Core Technology & Services Overview, Broadcast Monitoring, and Media Identification, Audible Magic Corporation, Los Gatos, California, downloaded from web pages at http://www.audiblemagic.com, download date: Aug. 11, 2016, 11 pages.
Gracenote Entourage™, Gracenote, Inc., Emeryville, California, downloaded from webpage: http://www.gracenote.com/video/media-recognition-and-insights/, download date: Aug. 24, 2016, 5 pages.
Int'l Search Report and Written Opinion dated Jan. 17, 2018 in Int'l Application No. PCT/US2017/058285.
Int'l Search Report and Written Opinion dated Dec. 11, 2017 in Int'l Application PCT/US17/57952.

* cited by examiner

| ID of commercial | Title | Length | Content fingerprint | Storage location |
|---|---|---|---|---|
| | | | | |
| 44667799 | Toyota Camry commercial | 0:29 | | |
| 4466780 | GEICO commercial | 0:14 | | |
| 4466781 | Game of Thrones promo | 0:30 | | |
| :<br>: | | | | |

Figure 6

SYSTEM AND METHOD FOR DETECTING UNKNOWN TV COMMERCIALS FROM A LIVE TV STREAM

BACKGROUND OF THE INVENTION

TV advertising commercials exist in virtually all video data streams, subsidizing some or all of the cost of providing the content to the viewer. The ability to identify where the commercials exist in the video data stream has become an important goal for two main reasons. First, advertisers who pay to place the commercials wish to verify that the commercials were actually played, either by being "aired" during a broadcast, or "streamed" during an internet-based viewing session. The auditing process can be greatly enhanced if commercials can be identified as they are being played so that there can be a recordation to document the airing or streaming. Second, technology built into a video playing device, or executing concurrently with a video playing device, can "skip" commercials, assuming that the location of the commercials can be accurately identified so that no programming is skipped. Some conventional technology for identifying where commercials exist in a video data stream is described in an article entitled "Automatic Detection of TV Commercials" (Satterwhite, B.; Marques, O.; Potentials, IEEE, Volume 23, Issue 2, April-May 2004 pp. 9-12). Satterwhite et al. describes two main categories of methods for detecting commercials, namely, "feature-based detection" and "recognition-based detection." Feature-based detection uses general characteristics of commercials to detect their possible presence. Recognition-based detection works by trying to match commercials with ones that were already learned. Some general characteristics (heuristics) of commercials and commercial breaks include the following:

i. Multiple frames of black are displayed at the beginning and end of each commercial block and between each commercial in the block. There is no audio during these frames.

ii. If a network displays a logo in the corner of the screen, the logo will not appear during the commercials.

iii. Duration is typically some increment of 15 seconds, up to 90 seconds.

iv. Commercials are high in "action," measured by a relatively larger number of cuts per minute between frames compared to a TV show.

v. Commercial breaks tend to occur at the same time or near the same time in each episode of a given TV series.

Recently, a third reason has arisen to identify where the commercials exist in a video data stream. Mobile devices (e.g., tablets, smartphones) are now in heavy use while viewers watch television (TV). This provides a new platform for synchronized advertising delivery, wherein the TV advertiser may extend their reach to the mobile device. For example, when a particular commercial is airing on, or streaming to, the TV, another commercial may be delivered to the mobile device in either near real-time or in a coordinated delayed time. The mobile ad may be for the same or different product or service as shown in the commercial that was aired on, or streamed to, the TV. To implement such a system, the commercial that was aired on, or streamed to, the TV must be able to be instantly identified.

To facilitate such a system, a database of commercials is maintained so that near real-time matching and identification occurs as a commercial is aired or streamed to a TV. However, each day a small, but significant percentage of commercials are new, and thus do not exist in the database. This results in missed opportunities to maximize the potential of synchronized advertising delivery because the content of the commercial being aired or streamed to the TV largely determines what type of ad should be delivered to the mobile device. One method of expanding the database with the new commercials is to obtain them from advertisers, ad agencies, broadcast networks, and the like. However, this is a laborious process and many of these entities will not provide the necessary information. Accordingly, there is a need to automatically detect unknown commercials directly from a video data stream the first time that they are aired or streamed, so that the database can be very quickly updated.

SUMMARY OF THE PRESENT INVENTION

Unknown potential commercials are detected in a video data stream that contains segments of program type content, and blocks of commercial content. Each block includes a plurality of successive individual commercials. A library of known commercials is maintained in a database. A video data stream is received in a video processing engine which includes a search engine that is in communication with the database. The search engine identifies all known commercials in the video data stream and their respective start and end times. The video processing engine identifies all time segments that are sandwiched between the known commercials. The video processing engine filters out as a potential commercial any identified time segments that are significantly longer than the time length of a commercial. The video processing engine designates content of each of the time segments that were not filtered out as being one or more unknown potential commercials.

BRIEF DESCRIPTION OF THE DRAWINGS

Preferred embodiments of the present invention will now be described by way of example with reference to the accompanying drawings:

FIG. 6 is a high level view of selected fields of a database for use in the system of FIG. 1.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

video data stream (also, referred to interchangeably as a "TV stream" and a "TV channel stream")—A video data stream includes (i) a conventional broadcast TV signal, typically delivered over a cable or fiber optic network via a set top box, CableCARD® or the like to a TV, (ii) an over-the-air (OTA) broadcast TV signal, and (iii) streaming services that deliver video content to a TV device that is connected to a viewer's home network. A video data stream may also be referred to as a "stream of audiovisual data" or an "audiovisual stream" since a video data stream typically includes audio.

commercial (also, referred to interchangeably as an "advertisement" or "ad")—A "commercial" is an advertisement for a product or service, and also includes advertising for program type content, known in the TV industry as a "promo." A commercial is thus distinguishable from "program type content." An example of "program type content" is a TV show.

commercial break (also, referred to interchangeably as a "block of commercial content," "commercial block," "ad block," or "ad pod")—Each commercial break includes a plurality of successive individual commercials. That is, the commercials are aired back-to-back in a set or group. Commercial breaks are interspersed during a TV program. The total length of the commercial breaks aired during a TV show is almost always significantly shorter than the length of the TV show. Likewise, the length of one commercial break is almost always significantly shorter than the lengths of the TV show segments that precede and follow the commercial break. A typical broadcast TV channel airs about 20 minutes of commercial content per hour. One common format for a commercial break is to show national advertisements first, followed by regional/local advertisements, and concluding with promos.

clip—The video data stream may be clipped between a start and stop time so as to capture a segment of interest, typically a potential commercial that has not yet been identified.

II. Detailed Disclosure

Figure 1:
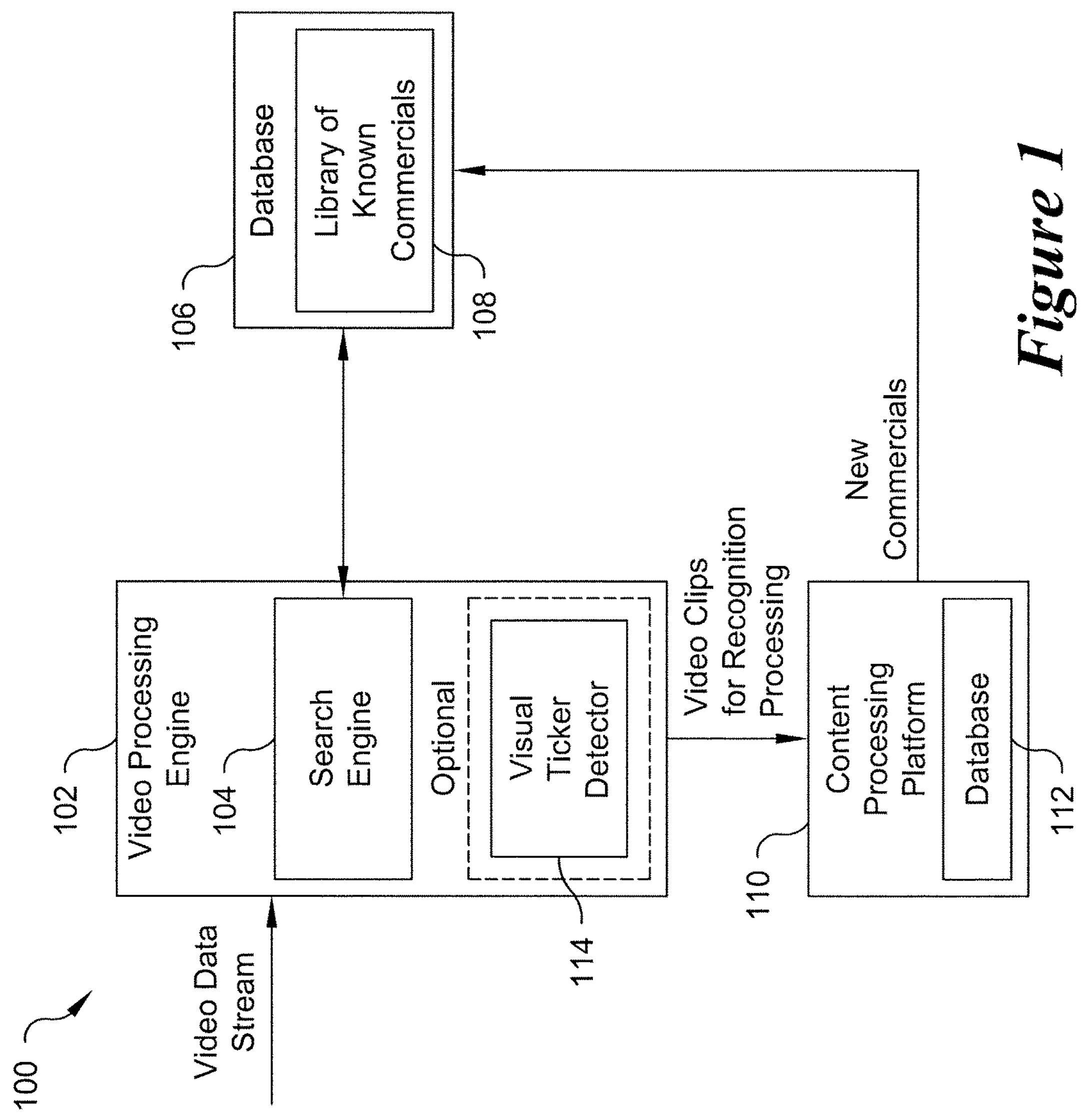
FIG. 1 shows a schematic diagram of a system for implementing one preferred embodiment of the present invention.

FIG. 1 shows a schematic diagram of a system 100 for implementing one preferred embodiment of the present invention. A video processing engine 102 receives one or more video data streams, such as one or more TV channel streams. A typical cable network includes hundreds of channels, so in practice there will be hundreds of video streams, one for each channel. However, for simplicity, the preferred embodiment is described in the context of one video data stream. The video processing engine 102 includes a search engine 104 in communication with a database 106 (also, referred to herein as a "first database") that maintains a library of known commercials 108. The search engine 104 continuously compares the video data stream to the library of commercials 108 in the database 106 to identify known commercials. Search engines that perform this type of recognition are well-known in the art and are incorporated into automated content recognition (ACR) systems. One type of ACR system having such a search engine uses audio fingerprints within video signals to perform the content recognition. One commercially available audio ACR system is made by Audible Magic Corporation, Los Gatos, Calif. Another commercially available audio ACR system is Gracenote Entourage™ commercially available from Gracenote, Inc., Emeryville, Calif. Other ACR systems are disclosed in U.S. Patent Nos. 2011/0289114 (Yu et al.), 2013/0071090 (Berkowitz et al.), and 2013/0205318 (Sinha et al.), each of which are incorporated by reference herein. Accordingly, the details of the search engine 104 and database 106 with respect to the recognition processing are not further described.

As is well-known in the art, search engines associated with ACR systems perform the comparisons on representations of content, such as fingerprints of the content. Thus, in one preferred embodiment, the database 106 maintains content fingerprints of known commercials for comparison with fingerprints of content in the incoming video data stream.

Clips of the video data stream that are determined to represent one or more commercials (using the process described below) and which are not in the library of known commercials 108 are presumed to be new commercials or groups of new commercials and are electronically communicated to a content processing platform 110 and stored in temporal or temporary database 112 (also, referred to herein as a "second database") for subsequent review, classification and digital curation that occurs a very brief time after storage. Upon proper identification of the new commercials or groups of new commercials, they are added to the library of known commercials 108. That is, the content processing platform 110 performs human and/or automated review, classification, and digital curation of the content. Various levels of automation may be employed to aid in the review, classification and curation processes, such as logo/brand detection using audio and/or video analysis. After a video clip is reviewed, it is deleted from the database 112. Any new video clips received by the content processing platform 110 are reviewed to determine if they are duplicates of video clips that are currently in the database 112. If so, the new video clip is discarded to avoid having to perform redundant review, classification and digital curation.

Figure 2:
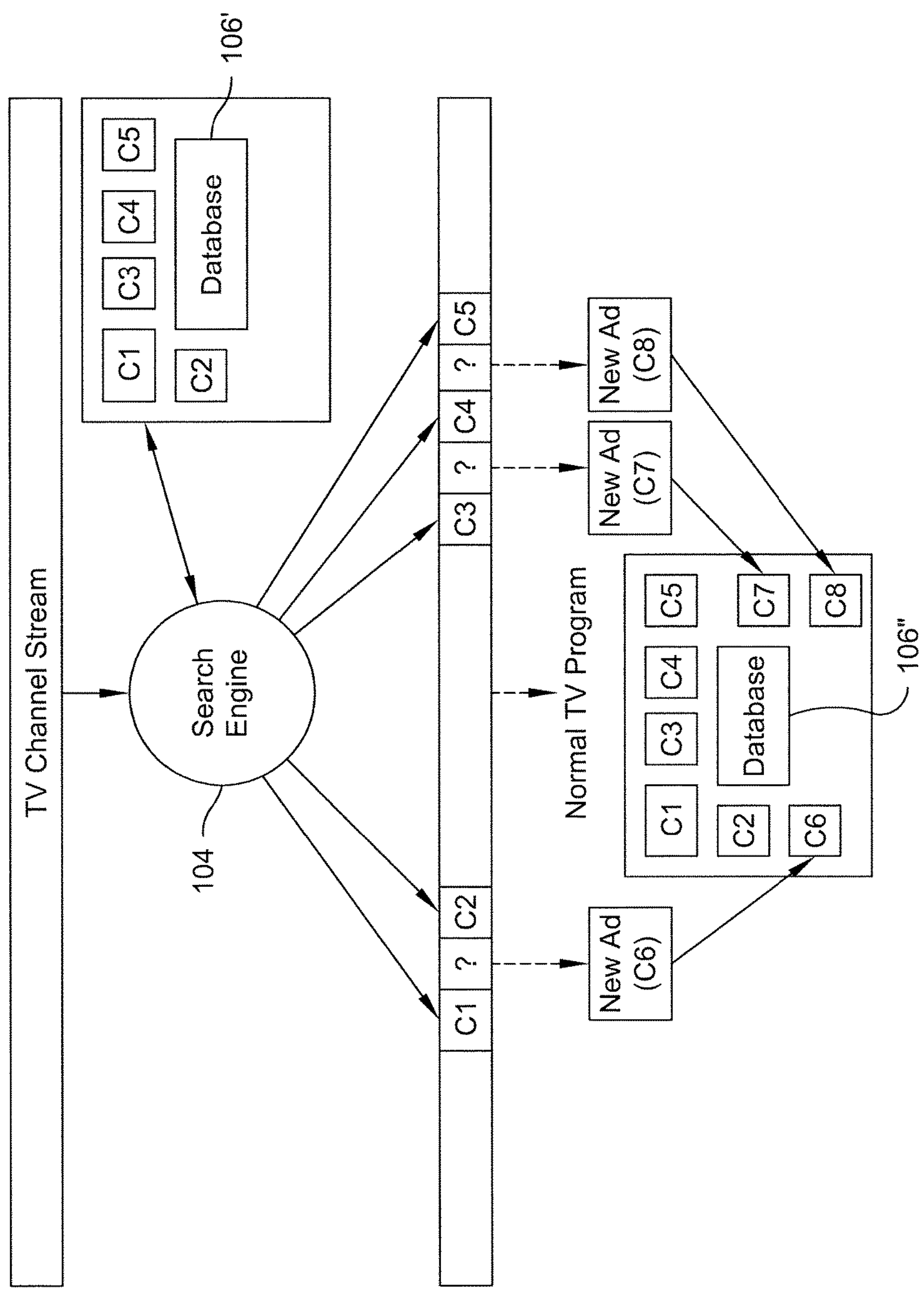
FIG. 2 shows an overview of the process implemented by the system of FIG. 1.

FIG. 2 shows an overview of the process implemented by the system 100. For simplicity, FIG. 2 only illustrates the search engine 104 and the database 106. However, these elements work in conjunction with the video processing engine 102 and content processing platform 110 shown in FIG. 1. For illustration purposes only, FIG. 2 shows a TV channel stream that contains eight commercial ads, database 106' that initially contains only five of the eight commercial ads, and the database 106" as it appears after being updated with three new ads that appeared in the TV channel stream.

As discussed above, commercials (ads) are typically aired during commercial breaks of a TV show. FIG. 2 shows two such commercial breaks. In the first commercial break, commercials C1 and C2 are aired and are both recognized by the system 100 because C1 and C2 both exist in the database 106'. In the second commercial break, commercials C3, C4 and C5 are aired and are also recognized by the system 100 because C3, C4 and C5 each exist in the database 106'. However, during the first commercial break, there is one time segment that is sandwiched between the two known commercials C1 and C2. Likewise, during the second commercial break, there are two time segments that are each sandwiched between two known commercials C3 and C4, and C4 and C5, respectively. The length of each of these three time segments generally match the short length of a typical commercial, compared to the much longer length of a TV show segment, and thus it can be presumed that one or more commercials were aired during each of these three time segments. Video clips are made of the content aired during these time segments and electronically sent to the content processing platform 110 shown in FIG. 1 for further review and classification. In this example, each of these video clips were determined to be a single commercial. Accordingly, new commercials C6, C7 and C8 were added to the database 106".

Figure 3:
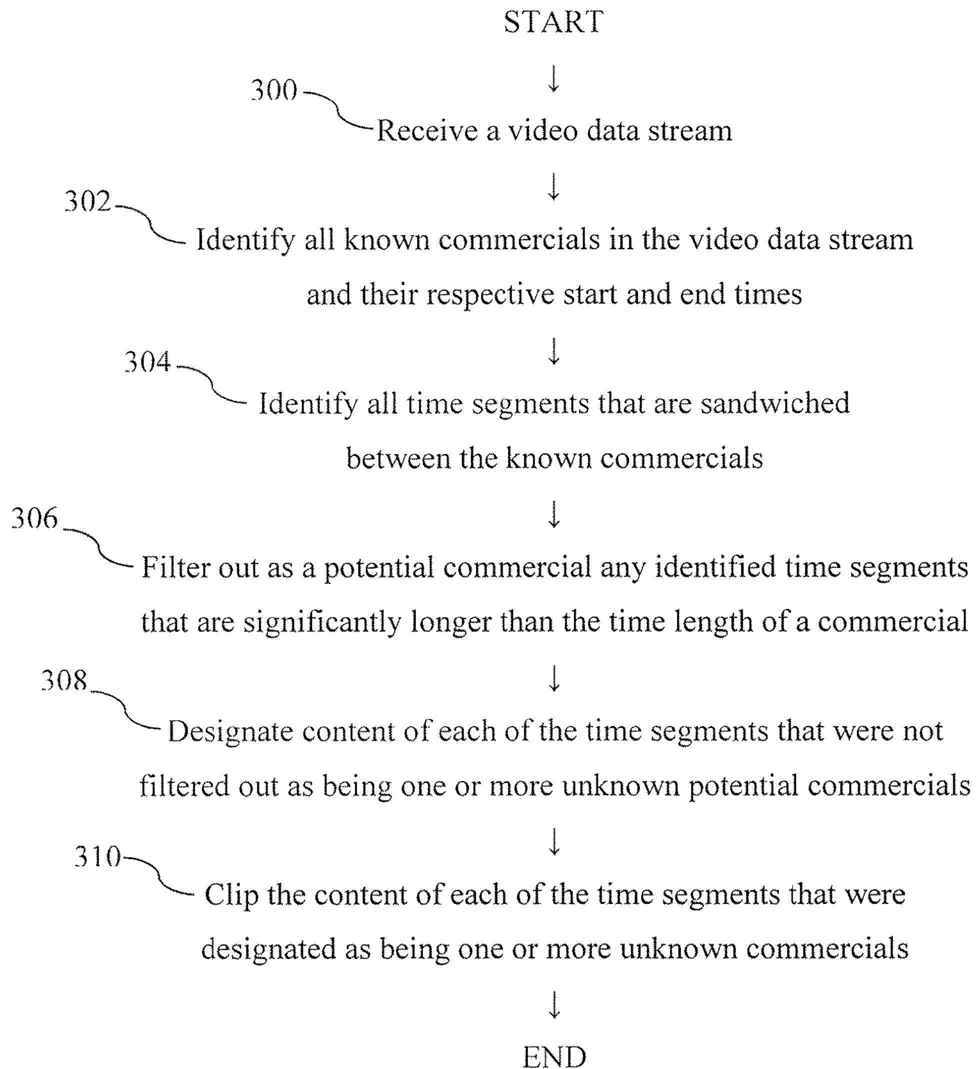
FIGS. 3-5 are flowcharts of preferred embodiments of the present invention implemented by the system of FIG. 1.

FIG. 3 is a flowchart of one preferred embodiment of the present invention implemented by the system 100. In this embodiment, it is not necessary to detect the beginning and end of commercial breaks.

STEP 300: Receive a video data stream.

STEP 302: Identify all known commercials in the video data stream and their respective start and end times.

STEP 304: Identify all time segments that are sandwiched between the known commercials.

STEP 306: Filter out as a potential commercial any identified time segments that are significantly longer than the time length of a commercial.

STEP 308: Designate content of each of the time segments that were not filtered out as being one or more unknown potential commercials.

STEP 310: Clip the content of each of the time segments that were designated as being one or more unknown commercials.

Figure 4:
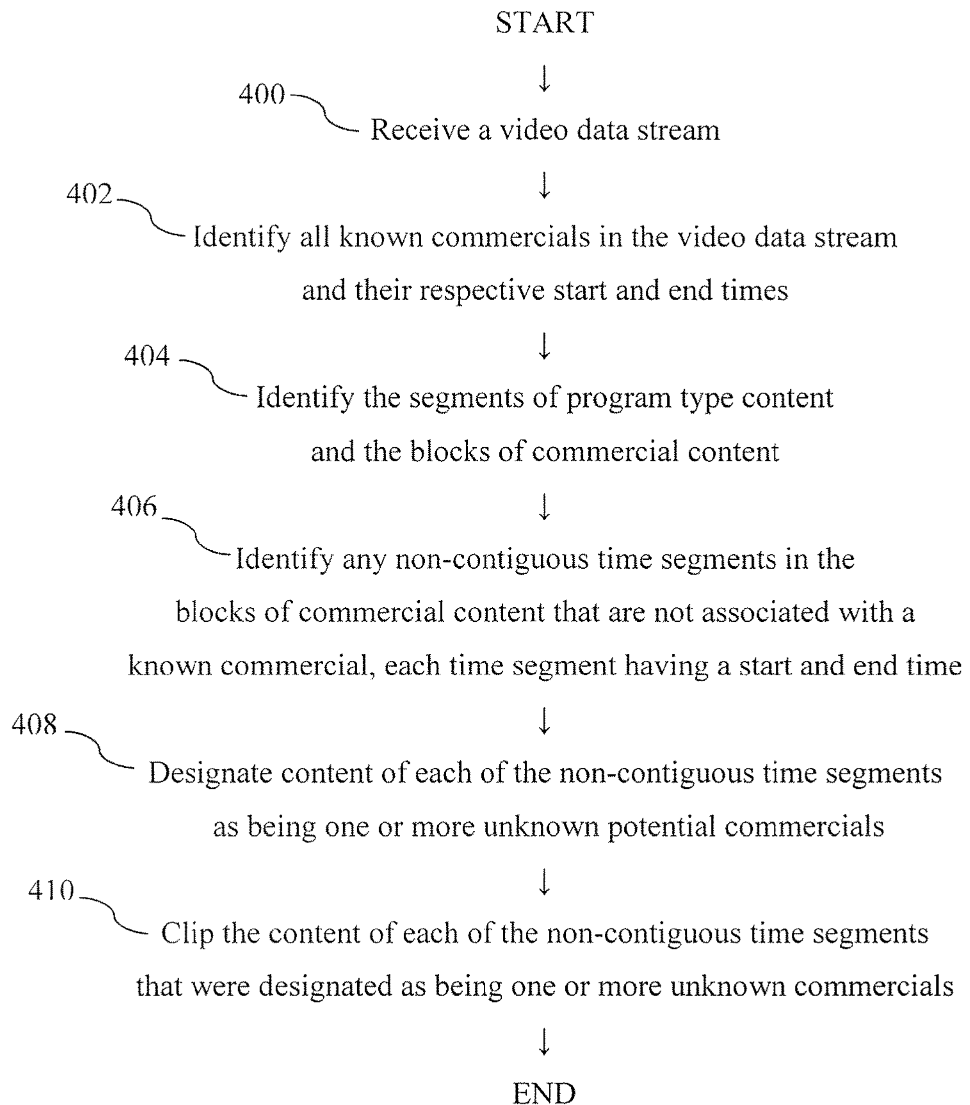

FIG. 4 is a flowchart of another preferred embodiment of the present invention implemented by the system 100. In this flowchart, it is presumed that the beginning and end of commercial breaks can be accurately detected.

STEP 400: Receive a video data stream

STEP 402: Identify all known commercials in the video data stream and their respective start and end times.

STEP 404: Identify the segments of program type content and the blocks of commercial content.

STEP 406: Identify any non-contiguous time segments in the blocks of commercial content that are not associated with a known commercial, each time segment having a start and end time STEP 408: Designate content of each of the non-contiguous time segments as being one or more unknown potential commercials.

STEP 410: Clip the content of each of the non-contiguous time segments that were designated as being one or more unknown commercials.

Figure 5:
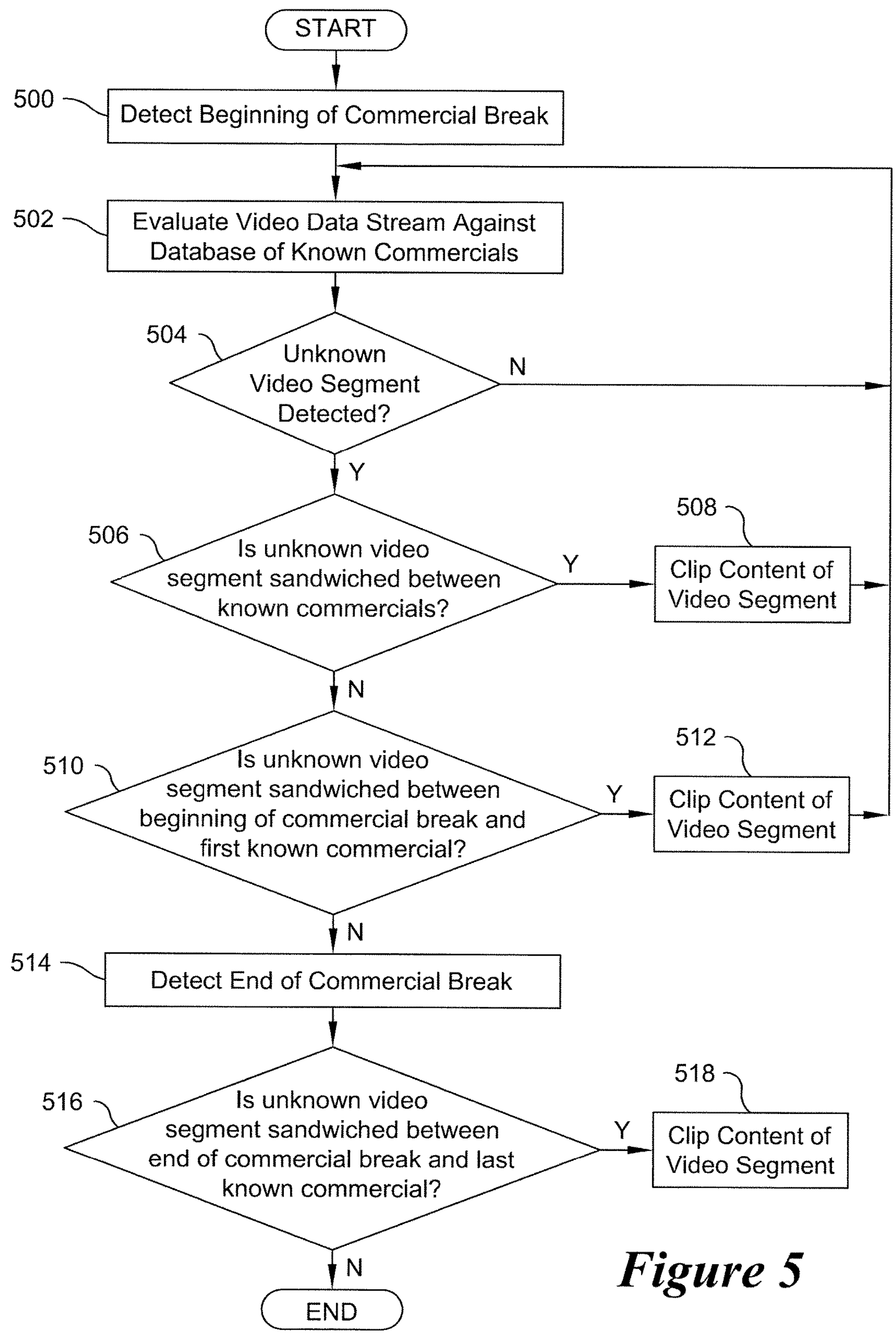

FIG. 5 is a flowchart of another preferred embodiment of the present invention implemented by the system 100. In this flowchart, it is also presumed that the beginning and end of commercial breaks can be accurately detected.

STEP 500: Detect that a commercial break has begun. Any combination of known techniques may be used to make this determination.

STEP 502: Evaluate the video data stream against the database 106 of known commercials.

STEP 504: Determine if an unknown video segment is detected. This is a time segment wherein the content aired within the time segment does not match a known commercial. The time segment should not be so short as to capture very short transition periods between commercials (e.g., 1 second). Also, if there is no content at all (e.g., screen is black), this time segment should be ignored. To ensure that this time segment is not accidentally detecting program type content, the time segment should be ignored if it is greater than a certain number of seconds, such as 180 seconds, which is the length of two back-to-back 90 second commercials.

STEP 506: If so, determine if it is sandwiched between known commercials. If so, clip the content of the video segment (STEP 508).

STEP 510: If an unknown video segment was detected that was not sandwiched between known commercials, but was sandwiched between the beginning of the commercial break and a first known commercial in the commercial break, clip the content of the video segment (STEP 512).

STEP 514: Detect the end of the commercial break.

STEP 516: If an unknown video segment was detected that was not sandwiched between known commercials, and was also not sandwiched between the beginning of the commercial break and a first known commercial in the commercial break, but was sandwiched between the end of the commercial break and a last known commercial in the commercial break, clip the content of the video segment (STEP 518).

The steps above will capture new commercials that appear at the beginning and end of commercial breaks which are scenarios that are not depicted in FIG. 2.

In scenarios where the beginning and end of commercial breaks cannot be accurately detected, any of the following options may be implemented.

i. Limit detection of new commercials only to situations where they appear between known commercials, effectively performing only steps 502-508 of FIG. 5. Since the percentage of new commercials each day is relatively low, and it is statistically likely that a new commercial will air sandwiched between known commercials at some point early in its campaign, the overall integrity of the database 106 will only be minimally impacted by this option. When implementing this option, it will be necessary to filter out as a potential commercial any video segments having time segments that are significantly longer than the time length of a commercial. For example, referring to FIG. 2, the video segment that is sandwiched between known commercials C2 and C3 is clearly part of the TV program and not a commercial.

ii. When a known commercial is detected after a significant commercial-free time length that can be deduced to have been program type content, perform additional audio and/or video analysis of the preceding 1-2 minutes of time to determine if any commercials potentially aired immediately preceding the detected known commercial. If a certain threshold of uncertainty is met indicating that there may have been commercial content in this preceding time period, clip the preceding 1-2 minutes of time for further recognition processing. This process addresses potential unknown commercials that may have appeared at the beginning of a commercial break. A similar process may be performed for unknown commercials that may have aired at the end of a commercial break, but which may be mistaken as part of the program type content. If a known commercial is detected, followed by a significant commercial-free time length that can be deduced to have been program type content, perform additional audio and/or video analysis of the succeeding 1-2 minutes of time to determine if any commercials potentially aired immediately after the detected known commercial. Again, if a certain threshold of uncertainty is met indicating that there may have been commercial content in this subsequent time period, clip the succeeding 1-2 minutes of time for further recognition processing. These additional clipping and recognition processing may also be used for the filtered out time segments in STEP 306 of FIG. 3 to reduce the incidence of missing unknown commercials that appear at the beginning or end of a commercial break.

In the processes described above, there could potentially be more than one new commercial in an unknown video segment. However, in most scenarios, the statistical likelihood is that there will only be one new commercial in the unknown video segment, particularly if the video segment has a length of about 15 or 30 seconds. However, it is not necessary to determine how many commercials are in the unknown video segment because this determination will be made in the content processing platform 110.

FIG. 6 shows a high level view of selected fields of a database 106, and more particularly, the library of known commercials 108 which are used by the search engine 104 and which receive new entries from the content processing platform 110. Selected fields include a unique identifier of a commercial, a title given to the commercial, length of the commercial, content fingerprint and storage location. As is well-known in the art, ACR systems may use digital fingerprints for content recognition matching. A content fingerprint is typically composed of a string of individual fingerprints, each capturing a very small time length of the content's audio and/or video.

III. Additional Considerations

A. Tickers

Certain TV channels, such as sports channels and financial news channels, scroll moving tickers along edges of the TV screen, typically in the upper or lower edge. Furthermore, the tickers often remain on the TV screen during commercial breaks. It is preferable to avoid processing TV channel streams that have tickers because the search engine 104 may have difficulty determining that a commercial aired with a ticker is actually the same commercial already stored in the library of known commercials. Furthermore, if a commercial is identified as a potential new commercial for failing to match a known commercial, it will be stored with the ticker, and thus will not exactly match the next viewing of the commercial which may have a different ticker stream (if aired on the same channel), or no ticker at all, if aired on a different channel. To address this scenario, the following options may be employed:

i. The video processing engine 102 may optionally include a visual ticker detector 114 to turn off processing of the video data stream upon detection of a ticker.

ii. Upon detection of the ticker, the video processing engine 102 may crop out the ticker, restore the original aspect ratio, and continue to process the video data stream in the same manner as described above.

iii. Upon detection of the ticker, if certain predefined conditions and rules are met, the video processing engine 102 may simply continue to process the video data stream in an unaltered state (i.e., with the ticker still in the video frames) in the same manner as described above.

While the presence of a ticker can be easily associated with channels through human observation, automated methods can also be used to assist with the determination of presence of ticker. As discussed above, the tickers are normally placed at the top or bottom of the screen covering a banner area from edge to edge and information inside them moves in a specific direction (left to right or right to left). One technique for ticker detection is to calculate the motion vectors of the video signal and determine the areas where the motion is either stationary or slowly moving in a left to right or right to left direction only. The areas in the screen that over longer time scales (e.g., minutes or hours) are found to exhibit the slowly moving behavior can be declared to contain ticker. Once detected, any of the options described above may be performed.

B. Short Program Content

In some types of programming, such as portions of a sports game, the video data stream will not mimic the paradigm of FIG. 2 wherein the program type content has a time length that is significantly longer than the time length of a commercial. Instead, the program type content may have a time length that is similar in length, or even shorter, than the time length of a commercial. If so, program type content may end up being clipped and sent for recognition processing since such content will not be filtered out by the filtering step 306 in the embodiment of FIG. 3. However, this scenario will be statistically rare for most video data streams and such program type content will be easily identified in the recognition process as not being a commercial.

C. Audio Data Streaming

In one alternative embodiment, the system described above may be used to detect unknown potential commercials in an audio data stream, which may include (i) a conventional broadcast audio signal, such as AM/FM or satellite radio, or (ii) streaming services that deliver audio content to a user's device that is connected to a network. The same system described above may be used to implement this embodiment wherein the audio data stream is processed in the same manner as the audio portion of the video data stream and the segments are audio segments, and wherein the search engine 104 uses audio-based ACR.

The present invention may be implemented with any combination of hardware and software. If implemented as a computer-implemented apparatus, the present invention is implemented using means for performing all of the steps and functions described above.

When implemented in software, the software code for the video processing engine 102 and its search engine 104 can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the video processing engine 102 and its search engine 104 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The video processing engine 102, database 106 and content processing platform 110 may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of detecting unknown potential commercials in a video data stream that contains (i) segments of program type content, and (ii) blocks of commercial content, each block including a plurality of successive individual commercials, wherein a library of known commercials is maintained in a first database, the method comprising:

(a) receiving a video data stream in a video processing engine;

(b) identifying, by a search engine that is in communication with the video processing engine and the first database, all known commercials in the video data stream and their respective start and end times;

(c) identifying, by the video processing engine, all time segments that are sandwiched between the known commercials;

(d) filtering out, by the video processing engine, as a potential commercial any time segments identified in step (c) that are longer than 180 seconds;

(e) designating, by the video processing engine, content of each of the time segments that were not filtered out in step (d) as being one or more unknown potential commercials;

(f) detecting, with a visual ticker detector, a ticker in the video data stream; and (g) turning off any processing of the video data stream by the video processing engine upon detection of a ticker.

2. An apparatus for detecting unknown potential commercials in a video data stream that contains (i) segments of program type content, and (ii) blocks of commercial content, each block including a plurality of successive individual commercials, wherein a library of known commercials is maintained in a first database, the apparatus comprising:

(a) a video processing engine that receives a video data stream;

(b) a search engine in communication with the video processing engine and the first database that identifies all known commercials in the video data stream and their respective start and end times, wherein the video processing engine is further configured to:

(i) identify all time segments that are sandwiched between the known commercials, (ii) filter out as a potential commercial any identified time segments that are longer than 180 seconds, and (iii) designate content of each of the time segments that were not filtered out as being one or more unknown potential commercials; and (c) a visual ticker detector that detects a ticker in the video data stream, wherein any processing of the video data stream by the video processing engine is turned off upon detection of a ticker.

3. A method of detecting unknown potential commercials in a video data stream that contains (i) segments of program type content, and (ii) blocks of commercial content, each block including a plurality of successive individual commercials, wherein a library of known commercials is maintained in a first database, the method comprising:

(a) receiving a video data stream in a video processing engine;

(b) identifying, by a search engine that is in communication with the video processing engine and the first database, all known commercials in the video data stream and their respective start and end times;

(c) identifying, by the video processing engine, the segments of program type content and the blocks of commercial content;

(d) identifying, by the video processing engine, any non-contiguous time segments in the blocks of commercial content that are not associated with a known commercial, each time segment having a start and end time;

(e) designating content of each of the non-contiguous time segments identified in step (d) as being one or more unknown potential commercials;

(f) detecting, with a visual ticker detector, a ticker in the video data stream; and (g) turning off any processing of the video data stream by the video processing engine upon detection of a ticker.

4. An apparatus for detecting unknown potential commercials in a video data stream that contains (i) segments of program type content, and (ii) blocks of commercial content, each block including a plurality of successive individual commercials, wherein a library of known commercials is maintained in a first database, the apparatus comprising:

(a) a video processing engine that receives a video data stream;

(b) a search engine in communication with the video processing engine and the first database that identifies all known commercials in the video data stream and their respective start and end times, wherein the video processing engine is further configured to:

(i) identify the segments of program type content and the blocks of commercial content;

(ii) identify any non-contiguous time segments in the blocks of commercial content that are not associated with a known commercial, each time segment having a start and end time, and (iii) designate content of each of the identified non-contiguous time segments as being one or more unknown potential commercials; and (c) a visual ticker detector that detects a ticker in the video data stream, wherein any processing of the video data stream by the video processing engine is turned off upon detection of a ticker.

* * * * *